United States Patent [19]

Watanabe et al.

[11] Patent Number: 5,068,145

[45] Date of Patent: *Nov. 26, 1991

[54] MAGNETIC RECORDING MEDIUM IN WHICH THE MAGNETIC LAYER CONTAINS A VINYL COMPOUND HAVING AN INNER SALT OF AN ALKYL AMINO ALKYL GROUP

[75] Inventors: Hideomi Watanabe; Tsutomu Okita, both of Kanagawa, Japan

[73] Assignee: Fuji Photo Film Co., Ltd., Kanagawa, Japan

[*] Notice: The portion of the term of this patent subsequent to Nov. 14, 2006 has been disclaimed.

[21] Appl. No.: 192,792

[22] Filed: May 10, 1988

[30] Foreign Application Priority Data

May 11, 1987 [JP] Japan .................................. 62-114048

[51] Int. Cl.$^5$ .............................................. G11B 23/00
[52] U.S. Cl. .................... 428/323; 428/425.9; 428/694; 428/900; 427/130; 427/44
[58] Field of Search .................. 428/900, 694, 425.9, 428/323; 427/128, 30, 44

[56] References Cited

U.S. PATENT DOCUMENTS

| | | | |
|---|---|---|---|
| 4,004,997 | 1/1977 | Tsukamoto et al. | 204/159.14 |
| 4,556,611 | 12/1985 | Nakajima | 428/694 |
| 4,560,616 | 12/1985 | Okita et al. | 428/423.1 |
| 4,562,117 | 12/1985 | Kikukawa et al. | 428/407 |
| 4,734,330 | 3/1988 | Oiyama et al. | 428/411.1 |
| 4,784,913 | 11/1988 | Nakamura et al. | 428/411.1 |
| 4,880,692 | 11/1989 | Ryoke et al. | 428/323 |

FOREIGN PATENT DOCUMENTS

| | | |
|---|---|---|
| 58-179936 | 4/1982 | Japan . |
| 62-6430 | 1/1987 | Japan . |
| 62-8329 | 1/1987 | Japan . |

*Primary Examiner*—Merrell C. Cashion, Jr.
*Assistant Examiner*—Stevan A. Resan
*Attorney, Agent, or Firm*—Sughrue,Mion,Zinn,Macpeak & Seas

[57] ABSTRACT

A magnetic recording medium comprising a non-magnetic support having provided thereon a magnetic layer comprising a binder and ferromagnetic particles dispersed therein, wherein the magnetic layer further contains a vinyl compound having an inner salt of an alkylaminoalkyl group and the magnetic layer has been irradiated with radiation.

12 Claims, No Drawings

MAGNETIC RECORDING MEDIUM IN WHICH THE MAGNETIC LAYER CONTAINS A VINYL COMPOUND HAVING AN INNER SALT OF AN ALKYL AMINO ALKYL GROUP

FIELD OF THE INVENTION

The present invention relates to a magnetic recording medium such as a video tape, an audio tape, a computer tape, or a floppy disk.

BACKGROUND OF THE INVENTION

A magnetic recording medium which is generally and widely used employs as a binder a thermoplastic resin such as a vinyl chloride/vinyl acetate resin, a vinyl chloride/vinylidene chloride resin, a cellulose resin, an acetal resin, a urethane resin, or an acrylonitrile/butadiene resin alone or in combination. However, such a magnetic recording medium has defects in that the magnetic layer has poor wear-out resistance so that the running systems of the magnetic tape are readily stained.

It is also known that a thermosetting resin such as a melamine resin or an urea resin is used as a binder and that a binder is chemically crosslinked by adding an isocyanate compound or a compound having an epoxy ring into the above described thermoplastic resin. However, these crosslinkable binders have defects in that (1) the storage stability of the magnetic particles dispersion is poor and, accordingly, the homogeneity of the magnetic coating composition as well as the homogeneity of the quality of the magnetic recording medium obtained, cannot be assured and (2) a heat treatment process for hardening the coated film is required after being coated and dried, and thus a long period of time for the production process is necessary.

In order to avoid the above defects, a method for preparing a magnetic recording medium has been proposed in which an acrylate type oligomer and monomer which can be hardened by radiation exposure after drying is used as a binder as disclosed in Japanese Patent Publication No. 12423/72, Japanese Patent Application (OPI) Nos. 13639/72, 15104/72, 77433/75 and 25231/81 (the term "OPI" used herein means an unexamined published application). However, a magnetic recording medium having good electromagnetic properties and high durability cannot be obtained by the above-described methods.

Recently, high image quality and high audio quality have been required for magnetic recording medium. In order to attain a high image quality and a high audio quality, it is necessary that a video head or an audio head should come into close contact with the surface of the magnetic layer and, thus, there is a need to improve the surface smoothness of the magnetic recording medium and there should be a remarkable improvement in the dispersibility of the ferromagnetic particles.

On the other hand, friction in the running system of, e.g., a video tape recorder, becomes high, since the surface of the magnetic layer becomes smooth, and thus the running tension becomes high. Under these severe circumstances, extremely high running durability is required for the magnetic recording medium.

However, when a magnetic recording medium runs in the video tape recorder, dust and contaminants adhere on the magnetic recording medium due to the static charge of the medium, causing an increase in drop outs and deteriorating running durability.

Because of the above reasons, a magnetic recording medium having good magnetic layer surface smoothness, good ferromagnetic particle dispersibility, and good running durability has not yet been realized.

In order to avoid the prior art problems, the present inventors have studied the use of thermoplastic resins and thermosetting resins as a binder, the addition of binders which are crosslinkable by the chemical reaction to these resins, and the use of resins which can be hardened by radiation crosslinking, and as a result have attained the present invention.

SUMMARY OF THE INVENTION

An object of the present invention is to provide a magnetic recording medium having characteristics which conventional magnetic recording media could not attain, that is, 1) good electromagnetic properties, 2) reduced number of drop outs, 3) good dispersibility of ferromagnetic particles, 4) good storage stability of a magnetic coating composition and good homogeneous quality and efficiency thereof, 5) good running durability, and 6) does not require a heat treatment process for hardening the coated film.

Other objects of the present invention will be apparent from the following description.

The above objects of the present invention can be attained by a magnetic recording medium comprising a non-magnetic support having provided thereon a magnetic layer comprising a binder and ferromagnetic particles dispersed therein, wherein said magnetic layer further contains a vinyl compound having an inner salt of a dialkylaminoalkyl group and said magnetic layer has been irradiated with radiation.

DETAILED DESCRIPTION OF THE INVENTION

The present invention will be described in detail below.

Preferred vinyl compounds having an inner salt of a dialkylaminoalkyl group are those represented by formula (I):

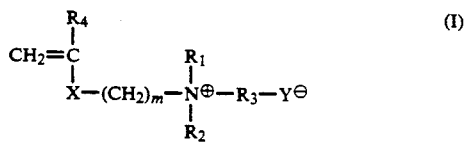

wherein m represents an integer of from 1 to 4;

$R_1$ and $R_2$ each represents an alkyl group having from 1 to 6 carbon atoms;

$R_3$ represents an alkylene group having from 1 to 6 carbon atoms;

$R_4$ represents a hydrogen atom, a methyl group, or an ethyl group;

Y represents $-COO^\ominus$, $-OPO_3^\ominus$, $-OPO_2^\ominus$, $-OSO_3^\ominus$, $-OSO_2^\ominus$, $-NO_3^\ominus$, or $-NO_2^\ominus$; and X represents $-COO-$, $-CONH-$, $-NHCOO-$, or $-NHCONH-$.

In the viny compounds represented by formula (I), Y preferably represents $-OPO_3^\ominus$ or $-COO^\ominus$.

Particularly preferred examples thereof are those having a betaine type as follows.

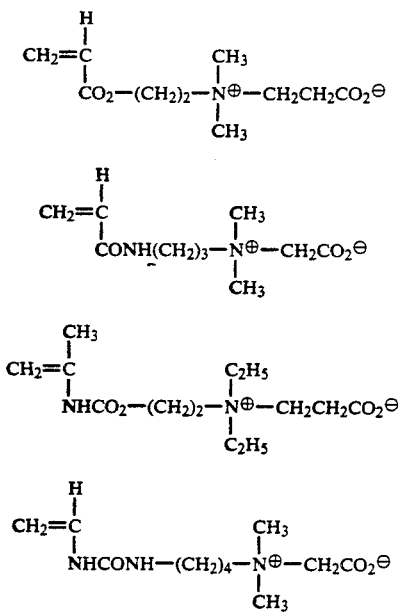

The dispersibility of ferromagnetic particles is effectively improved by adding these compounds. The preferred amount of these compounds is from 0.01 to 50 wt. %, more preferably from 0.02 to 30 wt. %, and most preferably from 0.05 to 15 wt % based on the total amount of the binder. When the additive amount thereof exceeds the above ranges, compatibility with other binders becomes poor and electromagnetic properties are deteriorated. When the additive amount thereof is outside the above ranges, the binder is unable to be hardened or durability is deteriorated.

Examples of the ferromagnetic particles used in the present invention include iron oxide particles, ferromagnetic chromium dioxide particles, ferromagnetic alloy particles, and barium ferrite particles.

The acicular ratio (axis length/axis width) of the ferromagnetic iron oxide and chromium dioxide particles is preferably from about 2/1 to 20/1, more preferably 5/1 to 20/1, and the average axis length of the ferromagnetic iron oxide and chromium dioxide particles is preferably from about 0.2 to 2.0 μm.

The ferromagnetic alloy particles preferably have a metal content of 75 wt % or more, and 80 wt % or more of the metal content is preferably a ferromagnetic metal (e.g., Fe, Co, Ni, Fe-Ni, Co-Ni, Fe-Co-Ni). The ferromagnetic alloy particles preferably have a long axis diameter of about 1.0 μm or less.

The most effective particles used in the present invention are iron oxide particles and ferromagnetic alloy particles each having a BET specific surface area (a specific surface area measured by the BET method) of 30 m²/g or more, more preferably 45 m²/g or more, which are difficult to disperse.

Particularly, the ferromagnetic alloy particles are most preferred since the present invention prevents the deterioration of the magnetic characteristics during storage which would normally occur.

Examples of the compounds which can be used in combination with the vinyl compounds containing an inner salt of an alkylaminoalkyl group include vinyl chloride type resins, urethane resins, polyester resins, phenoxy type resins, and cellulose type resins. The resins having a carbon-carbon unsaturated bond introduced into the main chain or the side chain thereof can be used in order to make it possible to harden the above resins by exposure to radiation.

The most preferred resins which can be used in combination with the vinyl compounds containing an inner salt of an alkylaminoalkyl group include vinyl chloride type resins, urethane resins, and radiation-hardenable-modified resins thereof.

Examples of the vinyl chloride type resins include a vinyl chloride/vinyl acetate copolymer, a vinyl chloride/vinyl acetate/maleic acid copolymer, a vinyl chloride/vinyl acetate/vinyl alcohol copolymer, a vinyl chloride/vinyl acetate/maleic acid/vinyl alcohol copolymer, a vinyl chloride/vinyl propionate/vinyl maleate copolymer, a vinyl chloride/vinyl propionate/vinyl alcohol copolymer, a vinylidene chloride/vinyl acetate/maleic acid copolymer, a vinylidene chloride/vinyl propionate/vinyl alcohol copolymer, a vinyl chloride/vinyl acetate/acrylic acid copolymer, a vinyl chloride/vinyl acetate/acrylic acid/vinyl alcohol copolymer, and saponified copolymers thereof.

Examples of the vinyl chloride type resins having a carbon-carbon unsaturated bond to enable it to harden by exposure to radiation include the resins as disclosed in Japanese Patent Application (OPI) Nos. 89207/86, 106605/86 and the like.

The resins containing —SO₃Na or —OPO₃H₂ in a side chain thereof in addition to —CO₂H of the above described maleic acid/acrylic acid copolymer can be used to further improve dispersibility.

Examples of the urethane resins include those having any one of a polyester skelton, a polyether skeleton, a polyester ether skeleton, and a polycarbonate skeleton as a main chain skeleton. Examples of the dibasic acid used therein include oxalic acid, malonic acid, succinic acid, glutaric acid, adipic acid, sebasic acid, dodecan-2-oic acid, maleic acid, fumaric acid, itaconic acid, trimethyladipic acid, hexahydrophthalic acid, phthalic acid, isophthalic acid, terephthalic acid and naphthalene dicarboxylic acid. Examples of the dihydric alcohols include ethylene glycol, trimethylene glycol, tetramethylene glycol, pentamethylene glycol, hexamethylene glycol, octamethylene glycol, diethylene glycol, triethylene glycol, tetraethylene glycol, 2,2-dimethylpropane-1,3-diol, 2,2-diethylpropane-1,3-diol, cylohexane-1,3-diol, cyclohexane-1,4-diol, cyclohexane-1,4-dimethanol, cyclohexane-1,3-dimethanol, 2,2-bis(4-hydroxyethoxy-cyclohexyl)propane, 2,2-bis(4-hydroxyethoxyphenyl)propane, 2,2-bis(4-hydroxyethoxyethoxyphenyl)propane and the like. The polyester skeleton of lactone type such as γ-caprolactone, δ-valerolactone and ε-caprolactone can also be used.

Examples of the isocyanates which form a urethane bond include polyisocyanates such as 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3-dimethyl-phenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate, or tolylenediisocyanate 3-adduct of trimethylolpropane. The above described dibasic acids and dihydric alcohols can be partially replaced by trivalent or more basic acids and trivalent or more hydric alcohols.

These polyurethane resins preferably have a molecular weight of from 2,000 to 200,000.

In view of the dispersibility and storage stability of the magnetic coating composition and the running durability of the magnetic recording medium, preferred examples of these urethane resins include a urethane type compound having a polar group such as —$CO_2H$, —$SO_3Na$, —$OPO_3H_2$, or —$OPO_3Na_2$ at the side chain of polyurethane resin, including at least a vinyl group for radiation crosslinking, and having a molecular weight of from 2,000 to 50,000 and an acid value of from 5 to 15.

A vinyl type monomer can be added as a component of the binder of the present invention. Examples of the vinyl type monomers include those which can be polymerized by radiation exposure and having at least one carbon-carbon unsaturated bond in the molecule such as (meth)acrylic acid esters, (meth)acrylamides, allyl compounds, vinyl ethers, vinyl esters, vinyl heterocyclic compounds, styrenes, acrylic acid, methacrylic acid, crotonic acid, itaconic acids or olefins. The following compounds having at least two methacryloyl groups are preferred. The specific examples include (meth)acrylates of polyethylene glycol such as diethyelene glycoldi(meth)acrylate, triethylene glycoldi(meth)acrylate or tetraethylene glycoldi(meth)acrylate, trimethylolpropane tri(meth)acrylate, pentaerythritoltetra(meth)acrylate, dipentaerythritolpenta(meth)acrylate, dipentaerythritolhexa(meth)acrylate, tris($\beta$-(meth)acryloyloxyethyl)isocyanurate, bis($\beta$-(meth)acryloyloxyethyl)isocyanurate, a reacted compound of polyisocyanate (e.g., 2,4-tolylenediisocyanate, 2,6-tolylenediisocyanate, 1,3-xylylenediisocyanate, 1,4,-xylylenediisocyanate, 1,5-naphthalenediisocyanate, m-phenylenediisocyanate, p-phenylenediisocyanate, 3,3-dimethylphenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate and tolylenediisocyanate 3-addition product of trimethylolpropane) with a hydroxy(meth)acrylate compound (e.g., 2-hydroxyethyl(meth)acrylate, 2-hydroxypropyl(meth)acrylate and the like), or other two or more functional poly(meth)acrylates. These monomers may be used alone or in combination. The amount of these monomers is preferably 50 wt % or less, and more preferably 30 wt % or less, based on the total amount of the binder.

Examples of the organic solvents used for dispersing and coating the magnetic coating composition include ketones such as acetone, methyl ethyl ketone, methyl isobutyl ketone, or cyclohexanone; esters such as methyl acetate, ethyl acetate, butyl acetate, ethyl lactate, or monoethyl ether of glycol acetate; ethers such as ethyl ether, glycol dimethyl ether, glycol monoethyl ether, dioxane, or tetrahydrofuran; aromatic hydrocarbons such as benzene, toluene, or xylene; and chlorinated hydrocarbons such as methylene chloride, ethylene chloride, carbon tetrachloride, chloroform, ethylene chlorohydrin, or dichlorobenzene.

Additives such as lubricating agents, abrasive agents, dispersing agents, antistatic agents, or rust-preventing agents may be added to the magnetic coating composition of the present invention. Examples of lubricating agents include higher fatty acids, fatty acid esters, higher fatty acid amides, and higher alcohols which are saturated or unsaturated and having 12 or more carbon atoms, as well as silicone oils, mineral oils, vegetable oils, and fluorine type compounds. These lubricating agents may be added upon preparing the magnetic coating composition, or may be sprayed on the surface of the magnetic layer, directly or after dissolving these agents in an organic solvent, after drying or radiation exposure.

The dry thickness of the magnetic layer of the magnetic recording medium according to the present invention is preferably from 0.5 to 5 $\mu$m, more preferably from 0.5 to 3.5 $\mu$m.

Examples of the materials of the support to be coated with the magnetic coating composition include polyesters such as polyethylene terephthalate or polyethylene 2,6-naphthalate; polyolefins such as polyethylene or polypropylene; cellulose derivatives such as cellulose triacetate; other plastics such as polycarbonate, polyimide or polyamideimide; non-magnetic metals such as aluminum, copper, tin, or zinc; non-magnetic alloys including the above; and plastics which have been vapor-deposited with metals such as aluminum.

The shape of the non-magnetic support may, for example, be any one of a flim, a tape, a sheet, a disk, a card, or a drum, and materials may be selected depending upon the shapes.

A backing layer may be provided on the surface of the support opposite to the magnetic layer to prevent static charge, print through, and wow and fluttering, and to improve the strength of the magnetic recording medium, or to make the back surface mat.

In the present invention, it is preferred that radiation exposure is carried out after the magnetic coating composition is coated and calendering treatment is conducted. Calendering treatment can be carried out after radiation exposure, and the radiation exposure can be carried out twice, that is, before and after the calendering treatment.

Examples of the types of radiation exposure which can be used harder the to be exposed on the magnetic layer of the present invention includes electron beams, $\gamma$-rays, $\beta$-rays and ultraviolet rays. An electron beam is preferred.

A scanning method, a double scanning method, a curtain beam method and a braod beam curtain method can be used for accelerating electron beams. The accelerating voltage of the electron beams is preferably from 100 to 300 KV, more preferably from 150 to 250 KV, and the absorption dose is preferably from 1 to 20 Mrad, more preferably from 3 to 15 Mrad. When the accelerating voltage is less than 100 KV, the amount of energy transmitted is insufficient and when it exceeds 300 KV, the energy efficiency used for polymerization decreases, and thus is uneconomical. When the absorption dose is less than 1 Mrad, the hardening reaction does not proceed to a sufficient degree and the desired strength of the magnetic layer can not be obtained. When it exceeds 20 Mrads, energy efficiency used for hardening decreases, and the irradiated object generates heat, whereby the support, particularly a plastic support, deforms, which is unfavorable.

The present invention will be illustrated in more detail by the following Examples and Comparative Examples but is not limited thereto. In the Examples and the Comparative Examples, all parts are by weight.

The acrylate of vinyl chloride copolymer used in the Examples and the Comparative Examples was synthesized in accordance with the disclosure of Japanese Patent Application (OPI) No. 89207/86.

The urethane acrylate used in the Examples and the Comparative Examples was synthesized in accordance with the method disclosed in Japanese Patent Application (OPI) No. 166316/85.

EXAMPLES 1 to 7 AND COMPARATIVE EXAMPLES 1 TO 2

A magnetic coating composition having the following formulation was mixed and kneaded for 50 hours using a ball mill.

Fe alloy particles (1500 Oe,: 400 parts BET specific surface area 50 m$^2$/g)

Composition for a binder

Vinyl chloride copolymer type: 60 parts acrylate (acid value 13, molecular weight 20,000, average content of acryloyl group 2.8/molecule)

3 parts $$CH_2=CH\text{--}CO_2(CH_2)_2\overset{\underset{CH_3}{|}}{\overset{|}{N}}{}^{\oplus}(CH_3)\text{--}CH_2CH_2CO_2{}^{\ominus}$$

Urethane acrylate (acid value 10,: 40 parts molecular weight 10,000, average content of an acryloyl group 3/molecule)
Stearic acid: 4 parts
Butyl stearate: 4 parts
Cr$_2$O$_3$ (average diameter: 0.3 μm): 4 parts
Carbon black (average diameter: 80 μm): 10 parts
Methyl ethyl ketone: 800 parts After the coating composition was dispersed, it was coated using a doctor blade on a polyethylene terephthalate support having a thickness of 10 μm to a dry thickness of 3 μm. Then magnetic orientation was carried out using cobalt magnets, and after the solvent was evaporated off at 100° C. for 1 minute, calendering treatment was carried out. The magnetic layer was then irradiated with electron beams having an accelerating voltage of 165 KV and a beam electric current of 6 mA for an absorption dose of 7 Mrad, and was slit to a width of ½ inch to obtain the magnetic video tape sample of Example 1.

The same procedures were repeated in the following Examples 2 to 7 and Comparative Examples 1 to 2 to obtain magnetic tape samples, except that the compounds shown in Table 1 were used instead of the compound:

$$CH_2=CH\text{--}CO_2(CH_2)_2\overset{\underset{CH_3}{|}}{\overset{|}{N}}{}^{\oplus}(CH_3)\text{--}CH_2CH_2CO_2{}^{\ominus}$$

used in Example 1.

The results are shown in Table 2.

The evaluation of the samples was made in the following manner.

Video S/N

Grey signals at 50%, set up were recorded using a VHS video tape recorder ("NV8300", manufactured by Matsushita Electric Industrial Co., Ltd.), and the noise was measured using a S/N meter "925 C type" manufactured by Shibasoku Co., Ltd. The S/N values are relative values based on an assumed S/N of Example 1 of 0 dB.

Storage Stability

The magnetic coating composition was allowed to stand still at room temperature for 24 hours and thereafter was stirred for 10 minutes and a magnetic tape was prepared using the thus stored coating composition in the same manner as in Example 1. Storage stability was shown in terms of the relative value of S/N of the magnetic tape using the thus stored composition to that using the composition which was not stored. The S/N of the tape using the non-stored composition was assumed to be 0 dB.

Number of Drop Outs

After running the tape for 100 passes, the number of drop outs having a duration of 15×10$^{-6}$ second or more per 1 minute was counted using a drop-out counter "VD-3D" manufactured by Victor Company of Japan Ltd.

Charging Potential

The charging potential of the tape at a rotary cylinder outlet was measured when the tape was run on the above-described video tape recorder.

TABLE 1

| Example and Comparative Example | Compound | Added amount |
|---|---|---|
| Example 2 | $CH_2=CH\text{--}CONH(CH_2)_3\overset{\underset{C_2H_5}{|}}{\overset{|}{N}}{}^{\oplus}(C_2H_5)\text{--}CH_2CH_2CO_2{}^{\ominus}$ | 3 parts |
| Example 3 | $CH_2=CCH_3\text{--}NHCO_2(CH_2)_2\overset{\underset{CH_3}{|}}{\overset{|}{N}}{}^{\oplus}(CH_3)\text{--}CH_2CH_2CO_2{}^{\ominus}$ | 3 parts |
| Example 4 | $CH_2=CH\text{--}NHCONH(CH_2)_2\overset{\underset{C_2H_5}{|}}{\overset{|}{N}}{}^{\oplus}(C_2H_5)\text{--}CH_2CO_2{}^{\ominus}$ | 3 parts |
| Example 5 | $CH_2=CH\text{--}CO_2(CH_2)_2\overset{\underset{CH_3}{|}}{\overset{|}{N}}{}^{\oplus}(CH_3)\text{--}CH_2CH_2CO_2{}^{\ominus}$ | 8 parts |

TABLE 1-continued

| Example and Comparative Example | Compound | Added amount |
|---|---|---|
| Example 6 | $CH_2=CH-CO_2(CH_2)_2-\overset{\oplus}{N}(CH_3)_2-CH_2CH_2CO_2^{\ominus}$ | 0.5 parts |
| Example 7 | $CH_2=CH-CO_2(CH_2)_2-\overset{\oplus}{N}(CH_3)_2-CH_2CH_2OPO_3^{\ominus}$ | 3 parts |
| Comparative Example 1 | $CH_2=CH-CO-\overset{\oplus}{N}(C_2H_5)_2-CH_2CH_2CO_2^{\ominus}$ | 3 parts |
| Comparative Example 2 | — | None |

TABLE 2

| Example and Comparative Example | Video S/N (dB) | Storage stability (dB) | Charging potential (Volt) | Number of drop outs |
|---|---|---|---|---|
| Example 1 | 0 | −1.2 | +5 | 6 |
| Example 2 | +0.3 | −1.3 | −3 | 4 |
| Example 3 | −0.2 | −1.1 | +10 | 10 |
| Example 4 | −0.3 | −1.4 | −13 | 12 |
| Example 5 | −0.5 | −1.6 | +10 | 19 |
| Example 6 | −0.6 | −1.6 | −15 | 20 |
| Example 7 | −0.7 | −1.6 | +20 | 22 |
| Comparative Example 1 | −1.2 | −2.0 | −80 | 52 |
| Comparative Example 2 | −2.3 | −2.6 | −150 | 63 |

It is clear from the results shown in Table 2 that the magnetic recording medium according to the present invention exhibits excellent electromagnetic properties and that the charge caused by friction upon tape running is reduced, and therefore dust and contaminants residing on the surface of the magnetic tape can be reduced, thereby reducing the number of drop outs and exhibiting excellent still durability. It is further noted that the the magnetic recording medium of the present invention has excellent storage stability.

While the invention has been described in detail and with reference to specific examples thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer comprising a binder and ferromagnetic particles dispersed therein, wherein said magnetic layer further contains a vinyl compound having an inner salt of a dialkylaminoalkyl group and said magnetic layer has been irradiated with radiation, and wherein said vinyl compound having an inner salt of a dialkylaminoalkyl group is represented by formula (I):

$$CH_2=\underset{X-(CH_2)_m-\overset{R_1}{\underset{R_2}{N^\oplus}}-R_3-Y^\ominus}{\overset{R_4}{C}} \quad (I)$$

wherein m represents an integer of from 1 to 4;

$R_1$ and $R_2$ each represents an alkyl group having from 1 to 6 carbon atoms:

$R_3$ represents an alkylene group having from 1 to 6 carbon atoms;

$R_4$ represents a hydrogen atom, a methyl group, or an ethyl group;

Y represents $-COO^\ominus$, $OPO_3^\ominus$, $-OPO_2^\ominus$, $-O-SO_3^\ominus$, or $-OSO_2^\ominus$, $-NO_3^\ominus$, or $-NO_2^\ominus$; and X represents $-COO-$, $-CONH-$, $-NHCOO-$, or $-NHCONH-$.

2. A magnetic recording medium as claimed in claim 1, wherein Y represents $-COO^\ominus$ or $-OPO_3^\ominus$.

3. A magnetic recording medium as claimed in claim 1, wherein said vinyl compound having an inner salt of a dialkylaminoalkyl group is selected from the following compounds:

$$CH_2=\underset{CO_2-(CH_2)_2-\overset{CH_3}{\underset{CH_3}{N^\oplus}}-CH_2CH_2CO_2^\ominus}{\overset{H}{C}}$$

$$CH_2=\underset{CONH(CH_2)_3-\overset{CH_3}{\underset{CH_3}{N^\oplus}}-CH_2CO_2^\ominus}{\overset{H}{C}}$$

$$CH_2=\underset{NHCO_2-(CH_2)_2-\overset{C_2H_5}{\underset{C_2H_5}{N^\oplus}}-CH_2CH_2CO_2^\ominus}{\overset{CH_3}{C}}$$

-continued

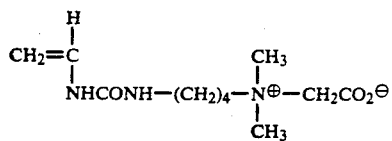

4. A magnetic recording medium as claimed in claim 1, wherein the amount of said vinyl compound having an inner salt of a dialkylaminoalkyl group is from 0.01 to 50 wt % based on the total amount of said binder.

5. A magnetic recording medium as claimed in claim 4, wherein the amount of said vinyl compound having an inner salt of a dialkylaminoalkyl group is from 0.02 to 30 wt % based on the total amount of said binder.

6. A magnetic recording medium as claimed in claim 5, wherein the amount of said vinyl compound having an inner salt of a dialkylaminoalkyl group is from 0.05 to 15 wt % based on the total amount of said binder.

7. A magnetic recording medium as claimed in claim 1, wherein the BET specific surface area of said ferromagnetic particles is 30 $m^2/g$ or more.

8. A magnetic recording medium as claimed in claim 7, wherein the BET specific surface area of said ferromagnetic particles is 45 $m^2/g$ or more.

9. A magnetic recording medium as claimed in claim 1, wherein said ferromagnetic particles are ferromagnetic alloy particles.

10. A magnetic recording medium as claimed in claim 1, wherein said binder is a vinyl chloride type resin, a urethane resin, or a radiation-hardenable-modified resin thereof.

11. A magnetic recording medium as claimed in claim 1, wherein said magnetic layer has been irradiated with an electron beam having an accelerating voltage of from 100 to 300 KV to an absorption dose of from 1 to 20 Mrad.

12. A magnetic recording medium as claimed in claim 11, wherein said magnetic layer has been irradiated with an electron beam having an accelerating voltage of from 150 to 250 KV to an absorption dose of from 3 to 15 Mrad.

* * * * *